US007770689B1

(12) United States Patent
Babaev

(10) Patent No.: US 7,770,689 B1
(45) Date of Patent: Aug. 10, 2010

(54) LENS FOR CONCENTRATING LOW FREQUENCY ULTRASONIC ENERGY

(75) Inventor: Eilaz Babaev, Minnetonka, MN (US)

(73) Assignee: Bacoustics, LLC, Minnetonka, MN (US)

( * ) Notice: Subject to any disclaimer, the term of this patent is extended or adjusted under 35 U.S.C. 154(b) by 0 days.

(21) Appl. No.: 12/429,677

(22) Filed: Apr. 24, 2009

(51) Int. Cl.
*G10K 11/00* (2006.01)
*G02B 15/14* (2006.01)
*G02B 21/18* (2006.01)
*G01N 29/04* (2006.01)

(52) U.S. Cl. .......................... 181/176; 73/606; 73/642; 359/354; 359/372; 359/651; 359/689; 367/150; 600/437; 600/459; 600/472; 601/2

(58) Field of Classification Search ................. 181/176
See application file for complete search history.

(56) References Cited

U.S. PATENT DOCUMENTS

| | | | | | |
|---|---|---|---|---|---|
| 3,544,806 | A | * | 12/1970 | Brienza et al. | 359/331 |
| 3,618,696 | A | * | 11/1971 | Hurwitz | 181/176 |
| 3,913,061 | A | * | 10/1975 | Green | 367/7 |
| 4,001,766 | A | * | 1/1977 | Hurwitz | 367/150 |
| 4,174,634 | A | * | 11/1979 | Dory | 73/606 |
| 4,338,821 | A | * | 7/1982 | Dion | 73/603 |
| 4,434,658 | A | * | 3/1984 | Miyazaki et al. | 73/618 |
| 4,457,175 | A | * | 7/1984 | Ramsey et al. | 73/606 |
| 4,674,505 | A | * | 6/1987 | Pauli et al. | 601/4 |
| 4,725,989 | A | * | 2/1988 | Granz et al. | 367/13 |
| 5,240,005 | A | * | 8/1993 | Viebach | 600/472 |
| 5,333,503 | A | * | 8/1994 | Hasegawa et al. | 73/642 |
| 5,365,024 | A | * | 11/1994 | Hasegawa et al. | 181/176 |
| 5,481,918 | A | * | 1/1996 | Hasegawa et al. | 73/642 |
| 5,839,446 | A | * | 11/1998 | Waner et al. | 128/898 |
| 5,984,871 | A | * | 11/1999 | TenHoff et al. | 600/459 |
| 6,059,773 | A | * | 5/2000 | Maloney et al. | 606/4 |
| 6,552,841 | B1 | * | 4/2003 | Lasser et al. | 359/305 |
| 6,661,571 | B1 | * | 12/2003 | Shioda et al. | 359/372 |
| 6,801,357 | B2 | * | 10/2004 | Shafer et al. | 359/354 |
| 6,916,296 | B2 | * | 7/2005 | Soring et al. | 601/2 |
| 7,025,735 | B2 | * | 4/2006 | Soring et al. | 601/2 |
| 7,186,004 | B2 | * | 3/2007 | Powell et al. | 362/244 |
| 7,567,284 | B2 | * | 7/2009 | Ikemachi et al. | 348/335 |
| 2002/0045819 | A1 | * | 4/2002 | Garlick | 600/437 |
| 2002/0082476 | A1 | * | 6/2002 | Takahashi et al. | 600/173 |
| 2003/0197923 | A1 | * | 10/2003 | Chuang et al. | 359/364 |
| 2005/0057820 | A1 | * | 3/2005 | Nishioka et al. | 359/689 |
| 2008/0156577 | A1 | * | 7/2008 | Dietz et al. | 181/176 |

* cited by examiner

*Primary Examiner*—Jeffrey Donels
*Assistant Examiner*—Christina Russell

(57) ABSTRACT

Disclosed is an ultrasonic lens configuration permitting the production of an acoustic field from low frequency ultrasound waves with predictable regions of energy concentration. The lens comprises at least three adjacent convex surface contours. Each surface contour corresponds to an arc of an ellipse. The first surface contour is within the center of the lens and is flanked by two adjacent contours. The flanking contours correspond to arcs from two symmetrical ellipses having semi-latus rectums at least equal to the semi-latus rectum of the ellipse to which the first, central, contour corresponds. The contours of the lens are arranged such that the flanking contours extend past the first contour by positioning the contours so that if the ellipses to which they correspond were drawn the ellipses of the flanking contours directly adjacent to the first contour would have their centers aligned on a plane parallel to and not below the major or minor axis of the ellipse of the first contour.

13 Claims, 5 Drawing Sheets

LENS FOR CONCENTRATING LOW FREQUENCY ULTRASONIC ENERGY

BACKGROUND OF THE INVENTION

1. Field of the Invention

The present invention relates to a lens for concentrating low frequency ultrasound with an acoustic field.

2. Description of the Related Art

As with light, it is possible to focus acoustics waves. Devices permitting a focusing of acoustic waves are generally referred to as lens. Acoustics lenses have been developed and utilized for a variety of purposes. Such lenses have been used to direct acoustics waves for the purpose of sonar detection. Acoustics lenses have also been employed to focus high frequency ultrasonic waves for the performance of various medical procedures such as sonograms. Less benign medical procedures can be performed using acoustics lenses to focus high intensity ultrasound on tissue to be ablated.

SUMMARY OF THE INVENTION

Disclosed is an ultrasonic lens configuration permitting the production of an acoustic field from low frequency ultrasound waves with predictable regions of energy concentration. The lens comprises at least three adjacent convex surface contours. Each surface contour corresponds to an arc of an ellipse. The first surface contour is within the center of the lens and is flanked by two adjacent contours. The flanking contours correspond to arcs from two symmetrical ellipses having semi-latus rectums at least equal to the semi-latus rectum of the ellipse to which the first, central, contour corresponds. The contours of the lens are arranged such that the flanking contours extend past the first contour by positioning the contours so that if the ellipses to which they correspond were drawn the ellipses of the flanking contours directly adjacent to the first contour would have their centers aligned on a plane parallel to and not below the major or minor axis of the ellipse of the first contour.

An ultrasonic lens so configured permits the concentration of ultrasound energy carried by low frequency ultrasound waves about at least one defined point above the surface of the lens. This concentration of ultrasound energy is similar in effect to that produced by focusing ultrasound waves on a specific point. Concentrating acoustic energy carried by low frequency ultrasonic waves about a predetermined point by focusing such waves, however, is difficult endeavor. The difficulty arises from the fact the low frequency ultrasound waves, unlike high intensity ultrasound waves, do not obey Snell's law of refraction. Thus, when attempting to focus low frequency ultrasound waves Snell's law cannot be used to predict the location of the aggregate focus of the ultrasound energy.

Focusing acoustical energy, however, is often desirable for various and diverse tasks. For instance, focused ultrasound energy may be employed to remove obstructions or accumulations from fluid passage ways. In fact, focused ultrasound energy has been suggested as a means of removing clots and performing angioplasty. Additionally, focused ultrasonic energy has been suggested as a means of ablating specific regions of cardiac tissue as to treat atrial fibrillation. In either surgical procedure it is important to limit secondary tissue damage. With respect to angioplasty, secondary tissue damage may induce an inflammation response increasing the likelihood of restenosis.

Secondary tissue damage may be limited by focusing the ultrasonic energy released from a lens about the point of an ablation. Accurately focusing ultrasonic energy using Snell's law requires the use of high intensity ultrasound. Utilizing focused high intensity ultrasound to ablate tissue, however, can place more energy at the site of the ablation than needed to ablate the tissue there. The excess energy may induce secondary tissue damage and unwanted inflammatory responses within the surrounding tissue about the point of ablation. Such collateral damage can be limited by concentrating low frequency ultrasonic waves about the point of ablation as to limit the amount excessive energy emitted into the site of ablation.

The disclosed ultrasound lens configuration permits the concentration of ultrasound energy carried by low frequency ultrasound waves about at least one defined point above the surface of the lens. The lens releases low frequency ultrasonic vibrations by expanding and contracting when induced to vibrate. When the lens expands it strikes the air or other medium about the lens inducing an ultrasonic wave within the medium. As this wave travels away from the lens it carries ultrasonic energy into the medium. Due to the configuration of the lens the ultrasonic energy emitted will be concentrated about points positioned at the intersection of lines radiating from the focus of two of the ellipses at a forty-five degree angle with respect to the semi-latus rectum and major axis of the ellipse from which each line originates.

The concentration of ultrasound energy above the surface of the lens may be magnified by refraction beneath the surface of the lens. When the lens contracts it induces an ultrasonic wave within the material of lens. The contours of the lens direct the compression about the wave towards the foci of the ellipses corresponding to each contour. The redirection of refraction compression can result in an increased deflection on regions of the lens located forty-five degrees above the foci of each ellipse with respect to the major axis and semi-latus rectum of the ellipse. The increased deflection which can be induced to occur at these regions on the surface of the lens results in a increased concentration of ultrasonic energy emitted from the lens about at least one point positioned at the intersection of lines radiating from the focus of two of the ellipses at a forty-five degree angle with respect to the semi-latus rectum and major axis of the ellipse from which each line originates.

BRIEF DESCRIPTION OF THE DRAWINGS

The present invention will be shown and described with reference to the drawings of preferred embodiments and clearly understood in its details. Like elements of the various embodiments depicted within the figures are equivalently numbered.

DETAILED DESCRIPTION OF THE INVENTION

An ultrasonic lens configured according the present invention comprises at least three adjacent convex contours corresponding to the arcs of three ellipses each having a focus, a semi-latus rectum, a center, a major axis, and a minor axis. The contours are adjacent in that each contour shares a common vertex with at least one other contour. Any of the ellipses to which the three contours correspond may also have a second focus.

Figure 1:
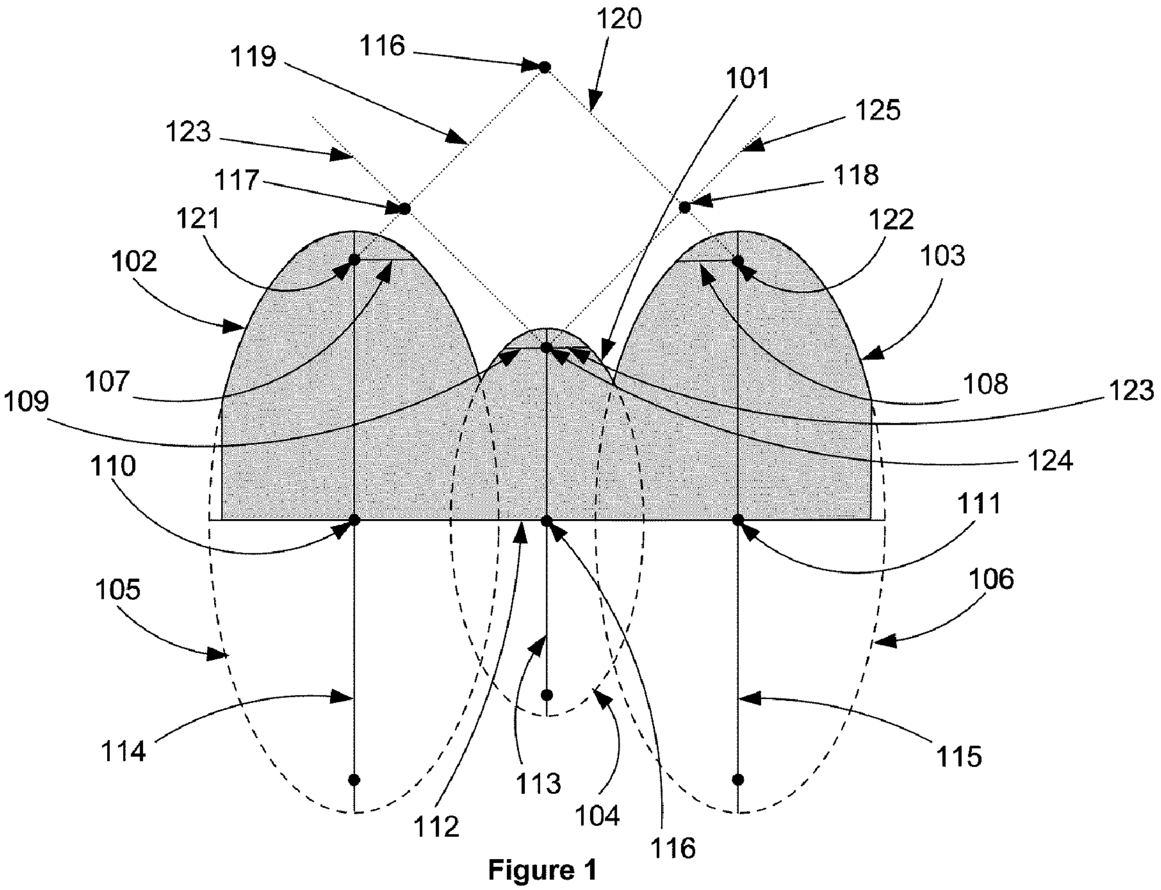
FIG. 1 depicts a cross-section of one possible lens configured according to the present invention.

Depicted in FIG. 1 is a cross-section of one possible lens configured according to the present invention. As illustrated in FIG. 1, the first or center contour 101 shares a vertex with the second contour 102 and third contour 103. The first contour 101 corresponds to an arc of a first ellipse 104 in that contour 101 is a section of ellipse 104. The second contour 102 and third contour 103 are adjacent to and flank the first contour 101. The contours 102 and 103 correspond to arcs of two symmetrical ellipses, 105 and 106 respectively, having semi-latus rectums 107 and 108, respectively, at least equal to the semi-latus rectum 109 of the first ellipse. As can be seen in FIG. 1, contours 105 and 106 extend past the first contour 101.

Figure 3:
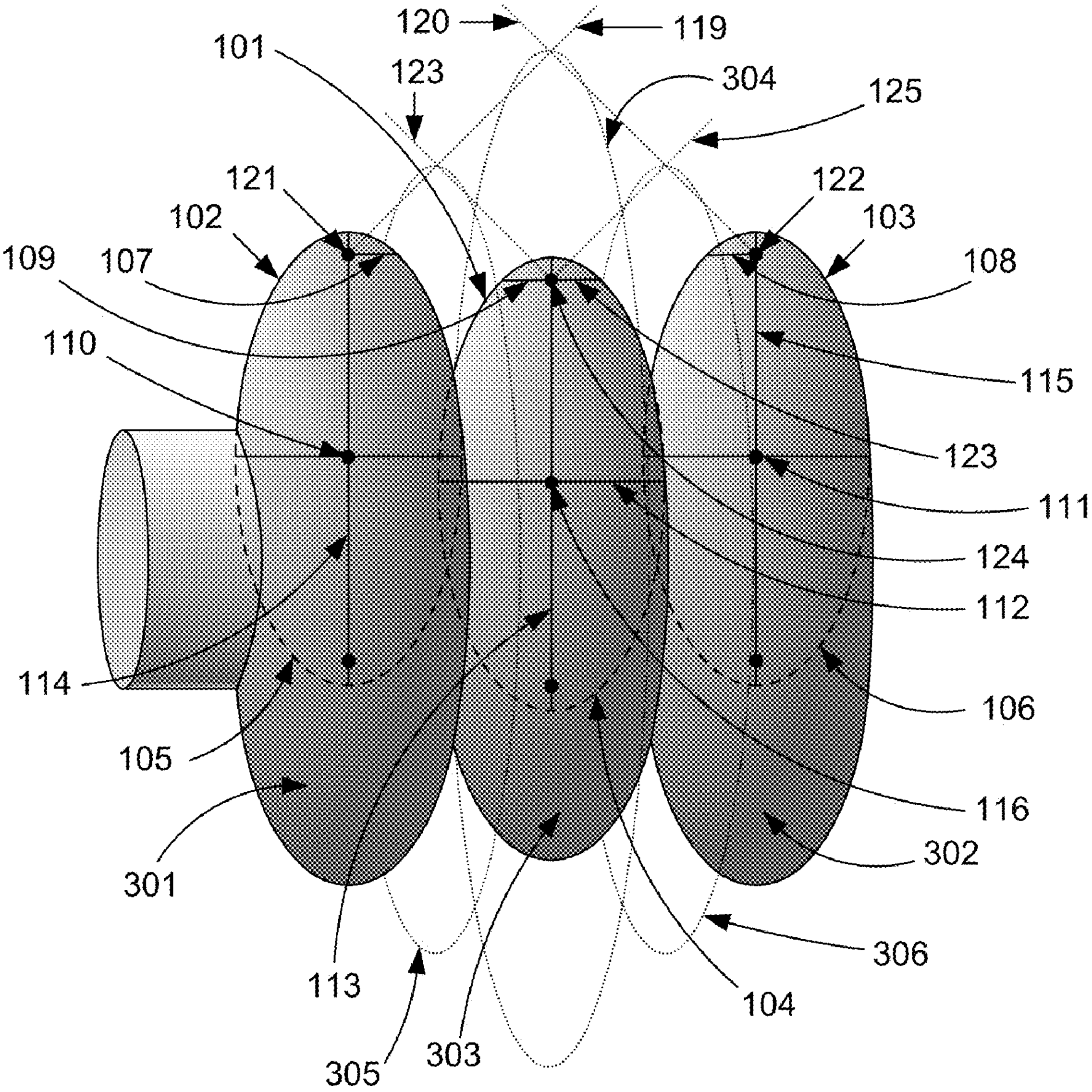
FIG. 3 depicts a possible alternative three-dimensional configuration in which the peripheral edges of three adjacent discs have elliptical contours.
Figure 4:
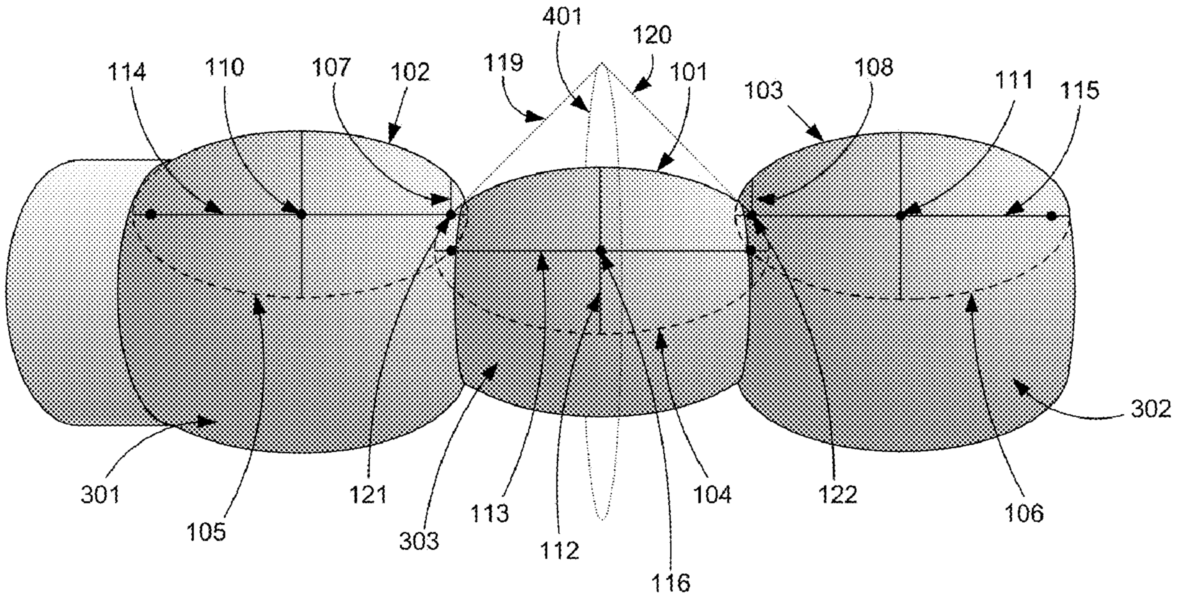
FIG. 4 depicts a possible alternative three-dimensional configuration in which the peripheral edges of three adjacent discs have elliptical contours.
Figure 5:
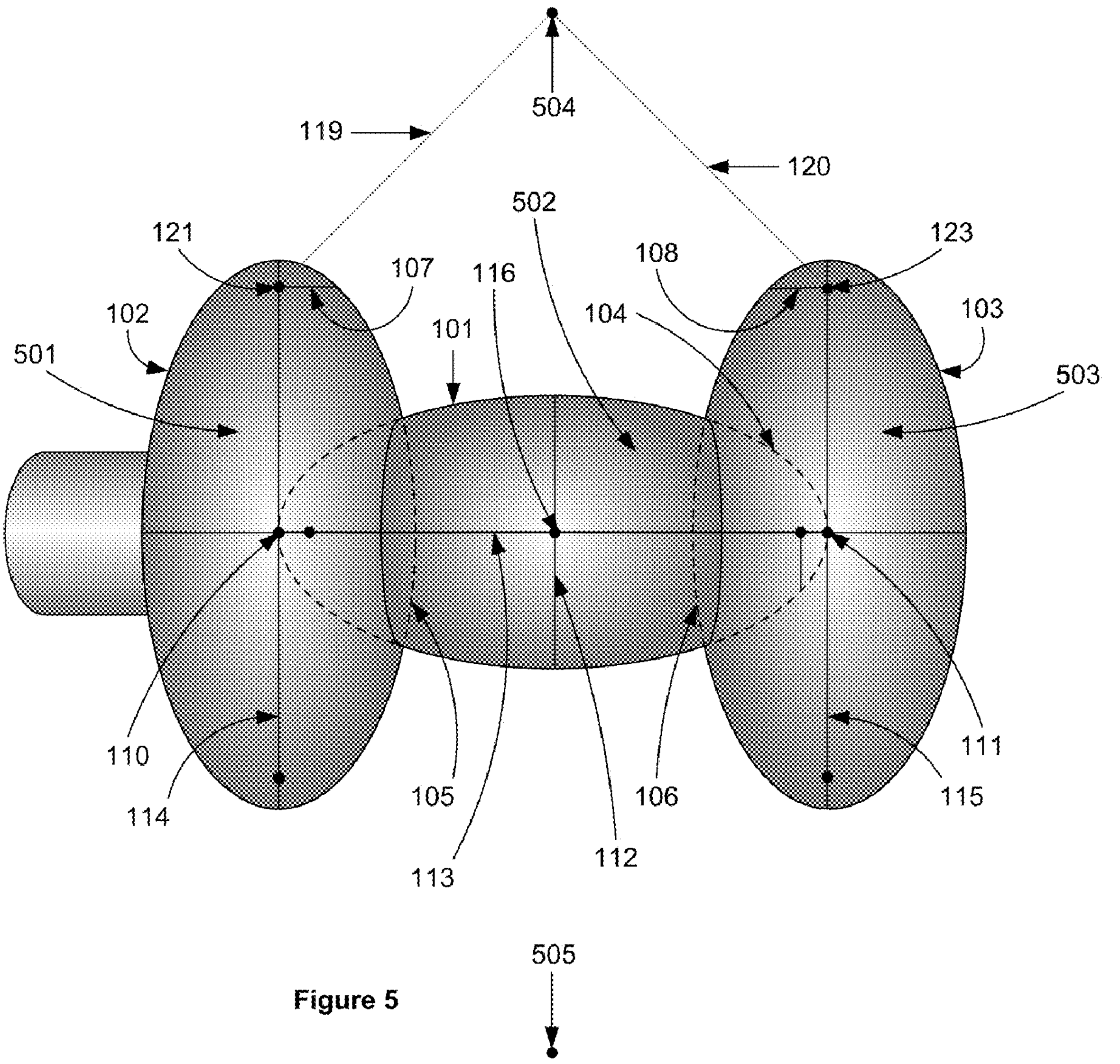
FIG. 5 depicts a possible alternative three-dimensional configuration of three adjacent ellipsoids.

In the embodiment depicted in FIG. 1, the centers 110 and 111 of the symmetrical ellipses 105 and 106, respectively, to which contours 102 and 103 correspond lie on a plane parallel to the minor axis 112 of ellipse 104. As depicted in FIG. 3, centers 110 and 111 could lie on a plane parallel to and above the minor axis 112 of ellipse 104. It is also possible, as depicted in FIGS. 4 and 5, to align centers 110 and 111 of the symmetrical ellipses 105 and 106 on a plane parallel to the major axis 113 of ellipse 104.

Symmetrical ellipses 105 and 106 to which contours 102 and 103 correspond may be aligned such that their major axis 114 and 115 are substantially parallel to the major axis 113 of ellipse 104, as illustrated in FIG. 1. Alternatively, as depicted in FIG. 5, ellipses 105 and 106 may be aligned such that their major axis 114 and 115 are substantially parallel to the minor axis 112 of ellipse 104. As illustrated throughout the accompanying figures, it is preferable that the centers 110 and 111 of the symmetrical ellipses 105 and 106 are offset an approximately equal distance from the center 116 of ellipse 104.

An ultrasonic lens containing an embodiment of the above described configuration permits the concentration of ultrasound energy carried by low frequency ultrasound waves about at least one defined point above the surface of the lens. As, illustrated in FIG. 1, a lens so configured will concentrate the ultrasound energy about the intersection of lines radiating from the focus of two of the ellipses at a forty-five degree angle with respect to the semi-latus rectum and major axis of the ellipse from which each line originates. For example, an ultrasonic lens configured to contain the contours specifically depicted in FIG. 1 will concentrate ultrasound energy about points 116, 117, and 118. The first point about which ultrasound energy will be concentrated, point 116, is located at the intersection of line 119 and 120. Line 119 extends from focus 121 of ellipse 105 at a forty-five degree angle with respect to semi-latus rectum 107 and major axis 114. At point 116 line 119 intersects line 120 extending from the focus 122 of ellipse 106 at a forty-five degree angle with respect to semi-latus rectum 108 and major axis 115. The second point about which ultrasound energy will be concentrated, point 117, is located at the intersection of line 119 and line 123 extending from focus 124 of ellipse 104 at a forty-five degree angle with respect to semi-latus rectum 109 and major axis 113. The third point about which ultrasound energy will be concentrated, point 118, is located at the intersection of line 120 and line 125 extending from focus 124 of ellipse 104 at a forty-five degree angle with respect to semi-latus rectum 126 and major axis 113. Depending on the number of intersections of such equivalent lines lying outside the confines of the lens, there may be more or less than three points about which the ultrasound energy emitted from the lens will be concentrated.

Figure 2:
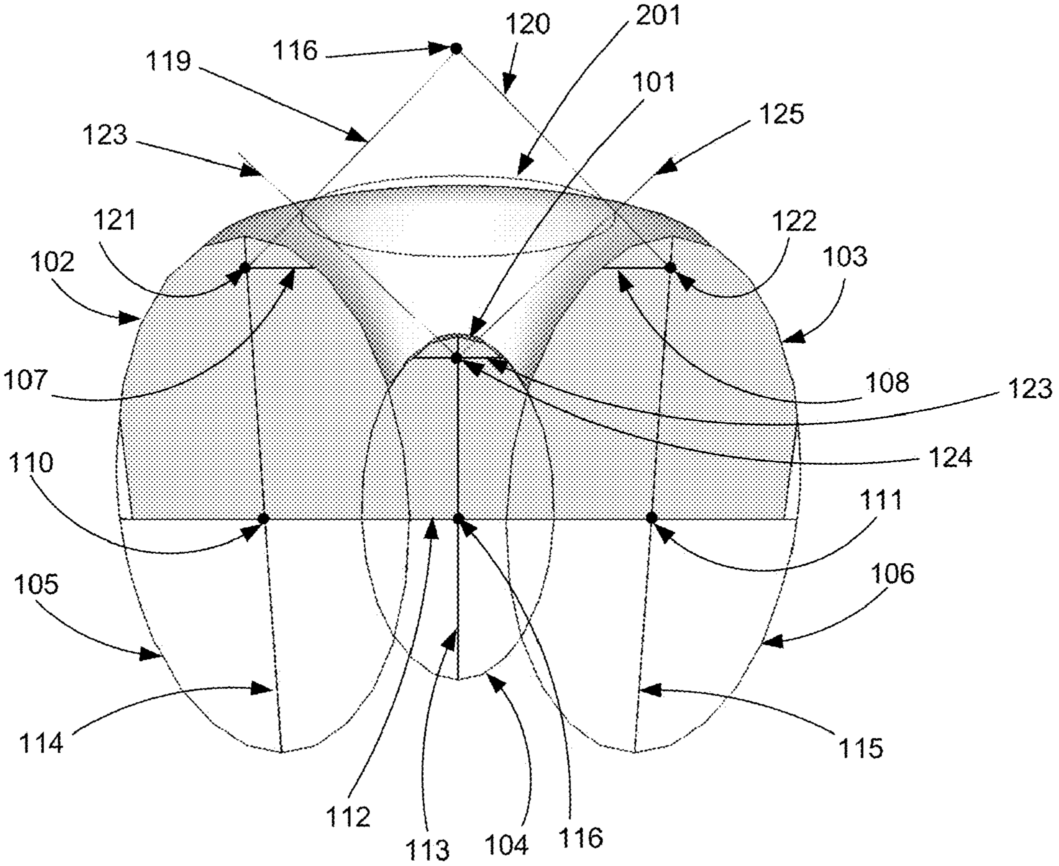
FIG. 2 depicts a cross-section of a possible three-dimensional lens configuration according to the present invention in which a ring surrounding an ellipsoid has elliptical contours.

An ultrasonic lens comprising the above described configuration can take on a variety of three-dimensional configurations. As illustrated in FIG. 2, the lens may have a three-dimensional configuration formed by rotating ellipses 104, 105, and 106 about the major axis 113 of ellipse 104. In the resulting three-dimensional configuration contours 102 and 103, corresponding to the symmetrical ellipses 105 and 106, respectively, represent the cross-section of a ring surrounding an ellipsoid that is the three-dimensional analogue of ellipse 104. A lens possessing the three-dimensional configuration depicted in FIG. 2 will concentrate the ultrasound energy emitted from the lens about ring 201 and point 116. Point 116 is located at the intersection of line 119 and 120. Line 119 extends from focus 121 of ellipse 105 at a forty-five degree angle with respect to semi-latus rectum 107 and major axis 114. Line 120 extends from focus 122 of ellipse 106 at a forty-five degree angle with respect to semi-latus rectum 108 and major axis 115. The ring about which ultrasound energy will be concentrated, ring 201, is located above the lens at the intersection of line 120 and line 125 extending from focus 124 of ellipse 104 at a forty-five degree angle with respect to semi-latus rectum 126 and major axis 113.

As depicted in FIGS. 3 and 4, a possible alternative three-dimensional configuration is one in which contours 102 and 103 correspond to peripheral edges of two discs 301 and 302, respectively, adjacent to and on either side of a center disc 303 the peripheral edge of which corresponds to contour 101. A lens possessing the three-dimensional configuration depicted in FIG. 3 will concentrate the energy emitted from the lens about rings 304, 305, and 306. The first ring about which ultrasound energy will be concentrated, ring 304, is located around the lens at the intersection of line 119 and 120. Line 119 extends from focus 121 of ellipse 105 at a forty-five degree angle with respect to semi-latus rectum 107 and major axis 114. Line 120 extends from focus 122 of ellipse 106 at a forty-five degree angle with respect to semi-latus rectum 108 and major axis 115. The second ring about which ultrasound energy will be concentrated, ring 305, is located around the lens at the intersection of line 119 and line 123 extending from focus 124 of ellipse 104 at a forty-five degree angle with respect to semi-latus rectum 109 and major axis 113. The third ring about which ultrasound energy will be concentrated, ring 306, is located around the lens at the intersection of line 120 and line 125 extending from focus 124 of ellipse 104 at a forty-five degree angle with respect to semi-latus rectum 126 and major axis 113.

A lens possessing the three-dimensional configuration depicted in FIG. 4 will concentrate the energy emitted from the lens about ring 401 located around the lens at the intersection of line 119 and 120. Line 119 extends from focus 121 of ellipse 105 at a forty-five degree angle with respect to semi-latus rectum 107 and major axis 114. Line 120 extends from focus 122 of ellipse 106 at a forty-five degree angle with respect to semi-latus rectum 108 and major axis 115.

The three-dimensional configuration of the lens does not have to be derived from rotating the contours 104, 105, and 106 about an axis. Accordingly, another possible three-dimensional configuration of the ultrasonic lens, as depicted in FIG. 5, is that of three adjacent ellipsoids 501, 502, and 503 which are the three-dimensional analogues of ellipses 105, 104, and 106 formed by rotating the ellipses about their major axis 114, 113, and 115, respectively. A lens possessing the three-dimensional configuration depicted in FIG. 5 will concentrate the energy emitted from the lens about two points. The first point, 504, is located above the lens at the intersection of line 119 and 120. Line 119 extends from focus 121 of ellipse 105 at a forty-five degree angle with respect to semi-latus rectum 107 and major axis 114. Line 120 extends from focus 122 of ellipse 106 at a forty-five degree angle with respect to semi-latus rectum 108 and major axis 115. The second point, 505, is equivalently positioned below the lens.

The lens may be constructed to contain any three-dimensional configuration possessing a convex contour corresponding to the arc of an ellipse flanked by two adjacent convex contours corresponding to arcs from two symmetrical ellipses with a semi-latus rectum at least equal to that of the first ellipse and centers positioned on a plane parallel to and not below an axis of the first ellipse.

Though specific embodiments of lens configurations have been illustrated and described herein, it will be appreciated by those of ordinary skill in the art that any arrangement, combination, and/or sequence that is calculated to achieve the same purpose may be substituted for the specific embodiments shown. It is to be understood that the above description is intended to be illustrative and not restrictive. Combinations of the above embodiments and other embodiments as well as combinations and sequences of the above methods and other methods of use will be apparent to individuals possessing skill in the art upon review of the present disclosure.

The mechanisms of operation presented herein are strictly theoretical and are not meant in any way to limit the scope of this disclosure and/or the accompanying claims.

It should also be appreciated that elements described with singular articles such as "a", "an", and/or "the" and/or otherwise described singularly may be used in plurality. Likewise, it should be appreciated that elements described in plurality may be used singularly.

The scope of the claimed apparatus and methods should be determined with reference to the appended claims, along with the full scope of equivalents to which such claims are entitled.

I claim:

1. An ultrasonic lens comprising:

a. a first convex surface contour corresponding to the arc of a first ellipse having a focus, a semi-latus rectum, a center, a major axis, and a minor axis; and b. a pair of convex contours adjacent to, flanking, and extending past the first contour corresponding to arcs of two symmetrical ellipses each having a focus, a semi-latus rectum at least equal to the semi-latus rectum of the first ellipse, a center, a major axis, and a minor axis;

c. wherein the centers of the symmetrical ellipses are aligned on a plane parallel to and not below an axis of the first ellipse.

2. The ultrasonic lens of claim 1 characterized by at least one of the ellipses having a second focus within the confines of the lens.

3. The ultrasonic lens of claim 1 further characterized by the first ellipse having a second focus within the confines of the lens.

4. The ultrasonic lens of claim 1 further characterized by the symmetrical ellipses each having a second focus within the confines of the lens.

5. The ultrasonic lens of claim 1 further characterized by the pair of contours corresponding to arcs of two ellipses aligned with their centers on a plane parallel to and not below the minor axis of the first ellipse.

6. The ultrasonic lens of claim 1 further characterized by the pair of contours corresponding to arcs of two ellipses aligned with their centers on a plane parallel to and not below the major axis of the first ellipse.

7. The ultrasonic lens of claim 1 further characterized by the pair of contours corresponding to arcs of two ellipses aligned with their major axis substantially parallel to the major axis of the first ellipse.

8. The ultrasonic lens of claim 1 further characterized by the pair of contours corresponding to arcs of two ellipses aligned with their major axis substantially parallel to the minor axis of the first ellipse.

9. The ultrasonic lens of claim 1 further characterized by the pair of contours corresponding to arcs of two ellipses having their centers offset an approximately equal distance from the center of the first ellipse.

10. The ultrasonic lens of claim 1 further characterized by the ellipses being rotated about an axis of the first ellipse to form a three-dimensional configuration characterized by the pair of contours corresponding to the symmetrical ellipses representing the cross-section of a ring surrounding an ellipsoid that is the three-dimensional analogue of the first ellipse.

11. The ultrasonic lens of claim 1 further comprising a three-dimensional configuration characterized by three adjacent ellipsoids which are analogues of the first ellipse and the two symmetrical ellipses.

12. The ultrasonic lens of claim 1 further comprising a three-dimensional configuration characterized by the pair of contours corresponding to peripheral edges of two discs adjacent to and flanking a center disc the peripheral edge of which corresponds to the first contour.

13. The ultrasonic lens of claim 1 further characterized by concentrating ultrasound energy above the lens about at least one point positioned at the intersection of lines extending from the focus of two of the ellipses at a forty-five degree angle with respect to the semi-latus rectum and major axis of the ellipse from which each line originates.

* * * * *